Figure 1:
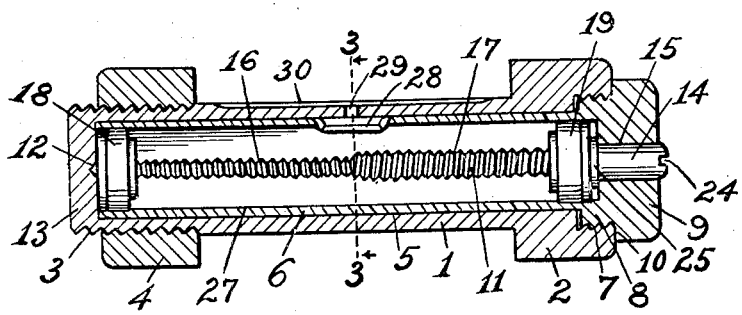

K. E. LYMAN.
BEARING LUBRICATING DEVICE.
APPLICATION FILED JAN. 17, 1920.

1,349,076.

Patented Aug. 10, 1920.

Inventor
Kent E. Lyman
By G. E. Dunstan,
his Attorney

UNITED STATES PATENT OFFICE.

KENT E. LYMAN, OF CLEVELAND, OHIO.

BEARING-LUBRICATING DEVICE.

1,349,076.

Specification of Letters Patent.  Patented Aug. 10, 1920.

Application filed January 17, 1920. Serial No. 352,138.

*To all whom it may concern:*

Be it known that I, KENT E. LYMAN, a citizen of the United States, residing at Cleveland, in the county of Cuyahoga and State of Ohio, have invented certain new and useful Improvements in Bearing-Lubricating Devices, of which the following is a specification.

This invention relates to lubricating bearing bolts for use in connection with automobiles, tractors, and machinery where it is desirable or necessary to have a connecting bolt serving also as a bearing.

The main object of the invention is to provide a bolt of said character, which is of simple construction and convenient for filling with lubricating oil or grease of sufficient quantity to last a considerable length of time.

Another object of the invention is to provide such a bolt having a removable receptacle which may be filled with lubricating oil or grease and pressure put upon the same occasionally to force it out upon the bearing surface without the necessity of soiling the hands with the oil or grease.

With the above and other objects in view as will be readily understood, the invention will be hereinafter fully described with reference to the accompanying drawing, and the novel features thereof will be distinctly pointed out in the appended claims.

In the drawings, similar characters of reference are used to designate corresponding parts.

Figure 2:
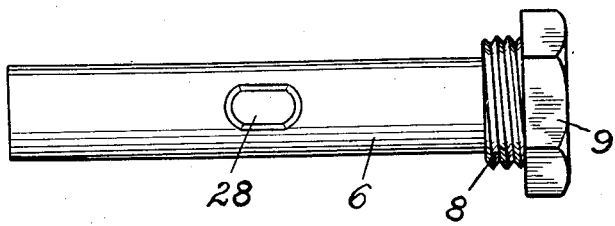
Figure 3:
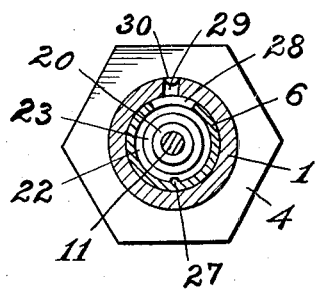
Figure 4:
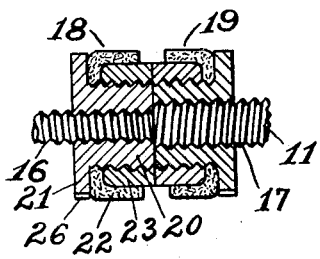

Figure 1 is a longitudinal sectional view of a lubricating bearing bolt constructed in accordance with my invention, Fig. 2 is a plan view of the oil or grease receptacle, Fig. 3 is a cross sectional view taken on line 3—3 of Fig. 1, and Fig. 4 is an enlarged sectional view of the plungers in their central positions upon the actuating screw.

Referring to the drawings, 1 represents the body of a bearing bolt having a head 2, and a threaded end 3 for receiving a nut 4. The body 1 of the bolt is hollowed out at 5 for receiving a tubular oil or grease receptacle 6, and its head 2 is bored and threaded at 7 for receiving the enlarged threaded part 8 formed integrally with said receptacle and terminating in a head 9, which is adapted to bear against the head 2 at 10.

Arranged within the oil or grease receptacle 6 is a screw 11, the inner end of which is supported in a conical recess 12 in the closed end 13 of said receptacle, and its other end 14 is rotatably mounted in and projects through an opening 15 of the head 9. The screw 11 is provided with right and left hand threads of smaller and larger diameters at 16 and 17 respectively for actuating a pair of plungers 18 and 19 toward and away from the transverse center of the screw. Each plunger consists of a similar member 20 having an end flange 21, which member is suitably bored and threaded for receiving the smaller or larger threaded diameters 16 and 17 of the screw 11. Upon each member 20 is an oppositely arranged cupped washer 22 of suitable diameter for filling the oil or grease receptacle 6, and a threaded collar 23 on the member 20 is adapted to retain said cupped washer in place. For convenience in rotating the screw 11 to actuate the plungers 18 and 19, its outer projecting end 14 is provided with a slot 24 for the application of a screw driver or other suitable tool. A collar 25 formed integrally with the screw 11 prevents longitudinal movement thereof, and a groove 26 is provided in each flange 21 for sliding upon a longitudinal guide 27 of the oil or grease receptacle 6 to prevent turning of the plungers 18 and 19. The receptacle 6 is removed by turning the nut 9, and then filled with oil or grease in the space between the plungers 18 and 19 by introducing the same through a central opening 28 in its wall. By turning the screw 11, the plungers 18 and 19 are actuated toward the center thereof and they force the oil or grease through the opening 28 and through an opposite opening 29 in the body 1 of the bolt for lubricating its outer or bearing surface 30.

From the disclosure set forth in the drawings and description, it is thought that the invention will be clearly understood and its advantages appreciated without further explanation, and it is to be understood that slight changes in the details of construction may be made within the scope of the claims.

Having fully described my invention, what I claim is:

1. In a lubricating bearing bolt, the combination of a hollow body, the hollow body having an opening through its wall, a receptacle for containing a lubricant, the receptacle being adapted to fit into and be removed from said hollow body, and the receptacle being provided with a filling opening opposite the opening in the wall of the body, substantially as described.

2. In a lubricating bearing bolt, the combination of a hollow body, the hollow body having an opening through its wall, a receptacle for containing a lubricant, the receptacle being adapted to fit into and be removed from said hollow body, the receptacle being provided with a filling opening opposite the opening in the wall of the body, and means for forcing the lubricant from said receptacle through said openings, substantially as described.

3. In a lubricating bearing bolt, the combination of a hollow body, the hollow body having an outlet opening, a removable receptacle within the hollow body adapted to contain a lubricant, the receptacle being provided with a filling opening adapted to be opposite the outlet opening of the body when the receptacle is in position, and means for forcing the lubricant out of said receptacle through said openings, substantially as described.

4. In a lubricating bearing bolt, the combination of a hollow body, the hollow body having an outlet opening, a removable receptacle within the hollow body adapted to contain a lubricant, the receptacle being provided with a filling opening adapted to be opposite the outlet opening of the body when the receptacle is in position, plungers for forcing the lubricant out of said receptacle through said openings, and means for actuating the plungers toward and away from each other, substantially as described.

5. In a lubricating bearing bolt, the combination of a hollow body, the hollow body having an outlet opening, a receptacle for containing a lubricant, the receptacle being removably fixed within the hollow body, the receptacle being provided with an opening adapted to receive the lubricant when the receptacle is removed from the hollow body and to be opposite the outlet opening of the body when the receptacle is within the body, plungers within the receptacle, a screw for actuating the plungers toward and away from said opening of the receptacle, and the screw projecting out of the receptacle to permit the rotating of the same, substantially as described.

In testimony whereof I affix my signature.

KENT E. LYMAN.